(12) United States Patent
Fenrich et al.

(10) Patent No.: US 10,032,063 B2
(45) Date of Patent: Jul. 24, 2018

(54) SYSTEM AND METHOD FOR GENERATING A REPRESENTATION OF VARIATIONS IN ELEVATION OF FRICTION RIDGES IN A FRICTION RIDGE PATTERN

(71) Applicant: IDENTIFICATION INTERNATIONAL, INC., Blacksburg, VA (US)

(72) Inventors: Richard K. Fenrich, Blacksburg, VA (US); Bryan D. Dickerson, Christiansburg, VA (US)

(73) Assignee: Identification International, Inc., Blacksburg, VA (US)

( * ) Notice: Subject to any disclaimer, the term of this patent is extended or adjusted under 35 U.S.C. 154(b) by 17 days.

(21) Appl. No.: 15/294,668

(22) Filed: Oct. 14, 2016

(65) Prior Publication Data

US 2018/0107852 A1  Apr. 19, 2018

(51) Int. Cl.
 *G06K 9/00* (2006.01)
(52) U.S. Cl.
 CPC ........... *G06K 9/001* (2013.01); *G06K 9/0002* (2013.01); *G06K 9/0008* (2013.01)
(58) Field of Classification Search
 None
 See application file for complete search history.

(56) References Cited

U.S. PATENT DOCUMENTS

| | | | |
|---|---|---|---|
| 3,982,836 A | 9/1976 | Green | |
| 4,577,345 A * | 3/1986 | Abramov | G06K 9/0002 340/5.82 |
| 7,274,396 B2 | 9/2007 | Bock | |
| 7,766,826 B2 | 8/2010 | Lee | |
| 8,265,352 B1 | 9/2012 | Neoh | |
| 8,736,581 B2 | 5/2014 | Han | |
| 9,848,130 B2 * | 12/2017 | Legakis | H04N 5/23293 |

(Continued)

FOREIGN PATENT DOCUMENTS

| | | | |
|---|---|---|---|
| CN | 201610088291.3 | * | 2/2016 |
| WO | 2014030129 A1 | | 2/2014 |
| WO | 2014057171 A1 | | 4/2014 |

OTHER PUBLICATIONS

Machine translation for CN 201610088291.3.*

(Continued)

*Primary Examiner* — Qian Yang
(74) *Attorney, Agent, or Firm* — Sheppard Mullin Richter & Hampton LLP (57) ABSTRACT

A representation of variations in elevation of friction ridges in a friction ridge pattern of a subject may be generated. A sequence of images captured over a time period may be obtained. Individual images in the sequence of images may indicate areas of engagement between an imaging surface and the friction ridge pattern of the subject when the individual images are captured. Temporal information may be obtained for the individual images. The temporal information for the individual images may be used to aggregate the individual images in the sequence of images into an aggregated representation of the friction ridge pattern. The aggregation may be accomplished such that the aggregated representation depicts the areas of engagement of the friction ridge pattern with the imaging surface at different elevations of the friction ridge pattern.

24 Claims, 6 Drawing Sheets

(56) References Cited

U.S. PATENT DOCUMENTS

| | | |
|---|---|---|
| 2002/0027605 A1 | 3/2002 | Lee |
| 2006/0227263 A1 | 10/2006 | Kunai |
| 2007/0075138 A1 | 4/2007 | Ross |
| 2007/0153258 A1 | 7/2007 | Hernandez |
| 2007/0165914 A1 | 7/2007 | Werthiem |
| 2008/0056539 A1 | 3/2008 | Sweeney |
| 2008/0187190 A1 | 8/2008 | Shin |
| 2010/0101961 A1 | 4/2010 | Lee |
| 2010/0302210 A1 | 12/2010 | Han |
| 2011/0096025 A1 | 4/2011 | Slobodin |
| 2011/0186712 A1 | 8/2011 | Blenkhorn |
| 2013/0202182 A1 | 8/2013 | Rowe |
| 2013/0272585 A1 | 10/2013 | Mueller |
| 2014/0337948 A1* | 11/2014 | Hoyos ................ H04L 63/0861 726/7 |
| 2015/0261367 A1 | 9/2015 | Zhang |
| 2017/0235994 A1* | 8/2017 | Yang .................... G06K 9/0002 382/124 |
| 2017/0316248 A1* | 11/2017 | He ..................... G06K 9/00006 |

OTHER PUBLICATIONS

S.C.B. Mannsfeld et al. Highly Sensitive Flexible Pressure Sensors with Micro-structured 7, 15, 23, 27 Rubber Dielectric Layers. Nature Materials 9, 859-864 (2010). [Retrieved Jul. 6, 2016) Retrieved from internet<http://www-ssrl.slac.stanford.edu/research/highlights_archive/pressuresensor> p. 859-864.

Fan, et al. Fractal Design Concepts for Stretchable Electronics. Nature Communications. 07 28, Feb. 29, 2014. Retrieved Jul. 6, 2016). Retrieved from internet<URL:http://www.nature.com/ncomms/2014/140207/ncomms4266/pdf/ncomms4266.pdf> pp. 1-8.

International Search Report and Written Opinion for PCTIB1756374, dated Jan. 18, 2018, 11 pages.

International Search Report and Written Opinion for PCTIB1756375, dated Feb. 9, 2018. 18 pages.

* cited by examiner

SYSTEM AND METHOD FOR GENERATING A REPRESENTATION OF VARIATIONS IN ELEVATION OF FRICTION RIDGES IN A FRICTION RIDGE PATTERN

FIELD OF THE DISCLOSURE

This disclosure relates to a system and a method for generating a representation of variations in elevation of friction ridges in a friction ridge pattern of a subject.

BACKGROUND

Fingerprints (i.e., friction ridge signatures) illustrate a pattern of friction ridges and valleys having features that may be identified. In two-dimensional fingerprint representations associated with existing fingerprint imaging technology, the top of the friction ridges appear to be flat and/or planar. However, friction ridges that make up the friction ridge pattern reflected in a fingerprint are more like mountain ranges, undulating up and down with areas of lower relative elevation and areas where peaks exist. These variations are not visible in typical fingerprints because the subject's finger is pressed against an imaging surface causing the peaks and undulating areas to flatten such that they are captured as if they were flat. As such, these variations in elevation are not visible as identification features.

A variety of methods for obtaining fingerprints have been developed. Because fingerprints generated by these new technologies may be matched against national fingerprint databases, which were initially built from ink fingerprint cards, there has been a tendency for fingerprints to be viewed as "good" quality if the fingerprint images have a similar appearance to those of a traditional ink fingerprint. As such, while multiple images may be captured in some slap fingerprint capture methods, only a single frame or image is used to identify features of the fingerprint, and the other images may be discarded as poor captures. Furthermore, the single frame or image used for typical fingerprint classification is an image in which pressure is adequate to ensure the friction ridges are compressed against the imaging surface such that they appear as dark ridge lines illustrating a pattern. Level I features, such as loops, arches, tents, deltas, and whorls, are mainly used to classify or subdivide fingerprints into broad categories. Level I features do not provide sufficient discriminating power to identify individuals. Level II features, such as ridge endings, bifurcations, and dots provide the basis of present day fingerprint identification algorithms. These features are classifications of the continuity of fingerprint ridge lines. In fact, the contrast of fingerprint images is often increased so that image processing algorithms can more accurately follow ridge lines to locate deviations from ridge line continuity. Relational maps of level II features are compared to national databases in order to identify individuals by their fingerprints.

Additional Level III features broadly arise from fine details of fingerprint patterns and ridges. Typical level III details may include ridge shape, width, and path deviation, pores, incipient ridges, breaks, creases, scars, and/or a variety of ridge edge contour details. Human experts may use Level III features to confirm the identity of an individual after a preliminary match based on level II features. Unfortunately, some level III features show significant variability within the same individual from fingerprints taken under different conditions. These factors have so far raised significant challenges for the use of level III features in automated fingerprint recognition algorithms.

SUMMARY

One aspect of the disclosure relates to generating a representation of variations in elevation of friction ridges in a friction ridge pattern of a subject. A friction ridge pattern is formed by the friction ridges of a subject and reflected in the friction ridge signature of the subject. Various types of imaging systems and/or systems may be used to capture the friction ridge signature of a subject. If a fingerprint scanner technology forms a two-dimensional image of the friction ridge signature as the subject's finger (or other part of a hand) is applied to an imaging surface, and the technology is capable of generating a sequence of such images, then the technology can also be applied in accordance with this disclosure to extract additional three dimensional topographical information. By way of non-limiting example, the imaging systems may include one or more of total internal reflection based imaging systems (i.e., TIR imaging systems), electroluminescent imaging systems (also known as electro-optical imaging or light emitting sensors), ultrasound scanners, three-dimensional scanners, other scanners, capacitive array imaging systems, pyro-electric (or thermal) imaging systems, radio frequency (RF) imaging systems, pressure sensor imaging systems, micro electro-mechanical devices, other optical sensor imaging systems, pressure sensitive membranes used with optical or electrical imaging systems, and/or other systems. The imaging systems and/or systems may capture a sequence of images. The sequence of images may be analyzed to extract detailed three-dimensional topography information regarding the friction ridge signature of the subject. As a subject presses their finger in contact with an imaging surface the areas of engagement between the imaging surface and the friction ridge pattern of the subject may change as time, pressure, and/or compression of the friction ridges changes. The highest elevation portions of the friction ridges may come into contact with the imaging surface before the lower portions of the friction ridges. As more pressure is applied by the subject, the friction ridges may flatten. When performing traditional "slap" fingerprint scans, existing technologies only use a single final image and/or frame of the friction ridge pattern of the subject when it is compressed and appears to comprise flat and/or planar ridges and valleys. When capturing a traditional "roll" fingerprint scan, existing technologies may stitch together multiple images to form a composite image that mimics the appearance of an inked roll fingerprint. The system and/or method herein describe a sequence of images captured by a sensor that captures the changing amount of surface area of the imaging surface engaged by the friction ridge pattern as more of the friction ridge pattern comes into contact with the imaging surface. The sequence of images may be aggregated to create an aggregated representation of the friction ridge pattern that depicts one or more changes in elevation of the friction ridges of the subject and/or topography of the friction ridges and/or friction ridge pattern of the subject.

The system may include one or more processors. The one or more processors may be configured by machine-readable instructions. The one or more processors may communicate with one or more imaging systems. The imaging system(s) may include one or more of a total internal reflection based imaging system (i.e., TIR imaging system), a electroluminescent imaging system, a ultrasound scanner, a three-dimensional scanner, a capacitive array imaging system, thermal sensor imaging systems, radio frequency (RF) imaging systems, pressure sensor imaging systems, other optical sensor imaging systems, and/or other systems. By way of non-limiting example, responsive to the imaging system(s) including a TIR based imaging system, the imaging system may include one or more of a platen, a light source, a sensor, a pressure sensitive membrane, and/or other elements of imaging system(s) and/or other imaging systems. In some implementations, the system may include one or more servers.

The pressure sensitive membrane may be arranged on the imaging surface. The pressure sensitive membrane may include one or more of a top surface, a bottom surface opposite the top surface, and/or an elastic deformable film forming at least a portion of the top surface. The pressure sensitive membrane may be formed such that an application of pressure at any location on the top surface of the pressure sensitive membrane deforms the elastic deformable film to reduce a distance between, and/or to increase the contact area between the deformable film and the imaging surface at such location. In some implementations, the pressure sensitive membrane may include one or more of an elastic film having a thickness between 1.5-10 μm, a light absorbing material, an electrically conductive layer, one or more standoffs on the bottom surface of the pressure sensitive membrane, and/or other features.

The machine-readable instructions may be configured to execute one or more components. The components including one or more of an information component, an aggregation component, a feature identification component, and/or other components. One or more processors may be configured to obtain a sequence of images. The sequence of images may be captured over a period of time. In some implementations, the system may include a sensor. The sensor may be configured to capture the sequence of images. The sequence of images may be captured over a time period. The individual images within the sequence of images may indicate areas of engagement between an imaging surface and the friction ridge pattern of the subject when the individual images are captured.

In some implementations, the individual images in the sequence of images may be captured as the areas of engagement increase over time due to increasing compression of the friction ridge pattern on the imaging surface. In some implementations, the individual images may be captured as one or more areas of engagement increase and/or decrease over time due to increasing and/or decreasing compression of one or more portions the friction ridge pattern on the imaging surface.

The information component may be configured to obtain temporal information for individual images. The temporal information may convey relative timing of capture for the individual images with respect to capture of the other images. In some implementations, the temporal information may include timestamps. As such, the individual images in the sequence of images may correspond to monotonically increasing timestamp values for the sequence of images. In some implementations, the sequence of images may include sequential video frames. A quantity of images in the sequence of images may be based at least partially on a frame rate of a video including the sequential video frames.

The aggregation component may be configured to use the temporal information for the individual images to aggregate the individual images in the sequence of images into an aggregated representation of the friction ridge pattern. The aggregation may accomplished such that the aggregated representation depicts the areas of engagement of the friction ridge pattern with the imaging surface at different elevations of the friction ridge pattern.

In some implementations, aggregating the sequence of images may include generating contours for the individual images. The contours may correspond to the areas of engagement of the friction ridge pattern with the imaging surface at different elevations and/or pressure applied to the imaging surface at different points in time over the time period. As such, the aggregated representation may include aggregation of the contours for the individual images in the sequence of images. In some implementations, aggregating the sequence of images may include generating gradients based on the sequence of images. The gradients may be generated based on changes in the areas of engagement of the friction ridge pattern with the imaging surface depicted in two or more images in the sequence of images. In some implementations, the gradients may codify one or more slopes of one or more friction ridges.

In some implementations, the aggregated representation of the friction ridge pattern may include a representation of a topography of the friction ridge pattern of the subject. Changes in the cross sectional shapes of the friction ridge pattern at different elevations and/or the temporal information may be used to determine relative elevations and/or relative heights of one or more three dimensional features of the friction ridge pattern of the subject. In some implementations, the relative elevation of one or more three dimensional features of the friction ridge pattern of the subject may be determined based on the changes in the areas of engagement between the imaging surface and the friction ridge patter at different elevations, and/or the temporal information.

In some implementations, the aggregated representation of the friction ridge pattern may include a pressure distribution, a pressure distribution map, and/or another pressure comparison.

Feature identification component may be configured to identify one or more level-three features of the friction ridge signature of the subject. One or more level-three features may be identified based on the aggregated representation of the friction ridge pattern. The one or more level-three features identified may include one or more topographical ridge peaks, topographical ridge notches, topographical ridge passes, pores, and/or other features.

Although this description primarily references friction ridge patterns located on a human finger and/or hand, it is considered to be applicable to any place on the human body having friction ridges and/or a friction ridge pattern (e.g., such as a foot, toe, heel, palm, and/or other parts of the body).

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
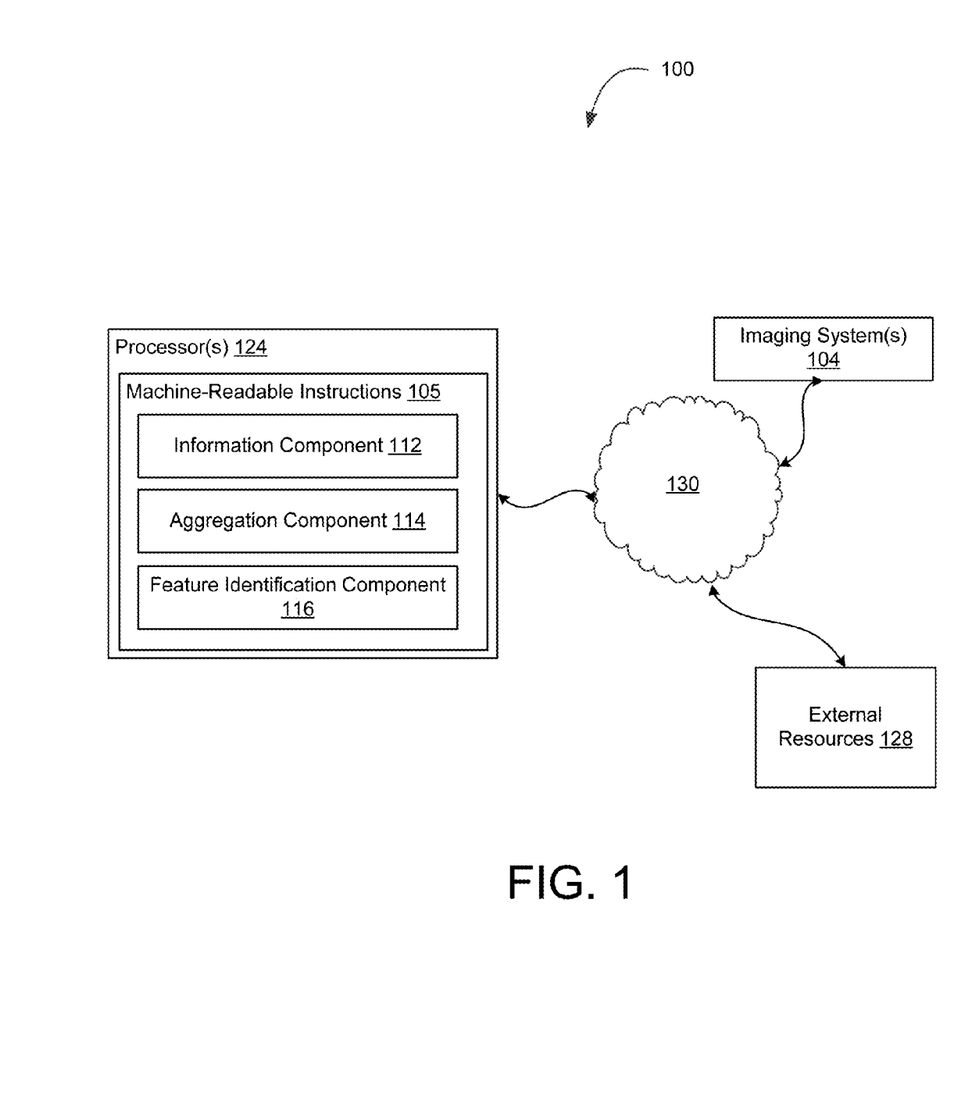
FIG. 1 illustrates a system configured to generate a representation of variations in elevation of friction ridges in a friction ridge pattern of a subject, in accordance with one or more implementations.

FIG. 1 illustrates a system 100 configured to generate a representation of variations in elevation of friction ridges in a friction ridge pattern of a subject, in accordance with one or more implementations. A friction ridge signature (i.e., fingerprint) may include an impression left by the friction ridges of a human finger (e.g., the pad of a human finger, and/or other portions of human finger and/or hand). System 100 described herein may generate a representation of variations in elevation of friction ridges in a friction ridge pattern of a subject by aggregating a sequence of images captured over time, such that multiple images in the sequence of images may be used for a given portion of the friction ridge pattern rather than just one.

System 100 may aggregate the individual images in the sequence of images into an aggregated representation of the friction ridge pattern. The aggregated representation may be used as a basis for identifying one or more elevations, depths, and/or three-dimensional features of the friction ridges of the subject. The aggregation may be accomplished such that the aggregated representation depicts the areas of engagement of the friction ridge pattern with the imaging surface at different elevations of the friction ridge pattern. The areas of engagement of the friction ridge pattern with the imaging surface at different elevations may be determined from the individual images indicating the areas of engagement between the imaging surface and the friction ridge pattern of the subject when the individual images are captured. In some implementations, the individual images may be captured as the areas of engagement increase over time due to increasing compression of the friction ridge pattern on the imaging surface.

Capturing a sequence of images as the subject presses their finger on an imaging surface and/or as the friction ridge pattern of a subject is compressed, may encode the history of the appearance and/or disappearance of elevation variations and/or the three dimensional features of the topography of the friction ridges as more and more pressure is applied and the friction ridges are compressed obscuring these elevation variations and/or three-dimensional features. The encoded history may be reflected in the aggregated representation of the friction ridge pattern. As such, the aggregated representation of the friction ridge pattern may be used to identify variations in elevation and/or three dimensional features of the friction ridges of the subject not visible in single frame fingerprint images.

System 100 may include one or more processor(s) 124. The one or more processor(s) 124 may be configured to communicate with one or more imaging system(s) 104. One or more processor(s) 124 may be configured to execute machine-readable instructions 105 to implement system components. The system components may include one or more of an information component 112, an aggregation component 114, a feature identification component 116, and/or other components. In some implementations, the system may include one or more server(s). The server(s) may be configured to communicate with one or more imaging system(s) 104.

In some implementations, imaging system(s) 104 may include a live scan imaging system. Imaging system(s) 104 may include one or more of a total internal reflection based imaging system (i.e., TIR imaging system), a electroluminescent imaging system, a ultrasound scanner, a three-dimensional scanner, a capacitive array imaging system, thermal sensor imaging systems, radio frequency (RF) imaging systems, pressure sensor imaging systems, other optical sensor imaging systems, and/or other systems.

By way of non-limiting example, total internal reflection is a known concept based on light traveling at different speeds in different materials. A refractive index, $n_i$, of a material, i, is the speed of light in a vacuum, c, divided by the velocity of light in the material, $v_i$: $n_i = c/v_i$. As light passes from one material to another, the change of speed results in refraction. Measured from perpendicular to the surface, the angle of incidence, $\theta_1$, and the angle of refraction, $\theta_2$, are given by Snell's law: $n_1 \sin(\theta_1) = n_2 \sin(\theta_2)$. Accordingly, when light emerges from a glass block ($n_1 \sim 1.5$) into air ($n_2 = 1$), the light will be refracted away from the perpendicular to the surface. That is, $\theta_2 > \theta_1$ because $n_1 > n_2$. At a critical angle of incidence, $\theta_c$, $\theta_2$ becomes 90° as the refracted light runs along the glass—air surface to form an evanescent wave. When $\theta_1 > \theta_c$, the incident light is reflected back into the glass by a process called total internal reflection (TIR). Changes in TIR may serve to generate an image of an applied fingerprint. The intensity of light reflected from the imaging surface at a particular location may be altered according to several optical mechanisms. For example, changing the local effective refractive index $n_2$ on or near the glass—air surface (by touching a finger or other material to the glass prism) may absorb or scatter the refracted ray or the evanescent wave.

Figure 2:
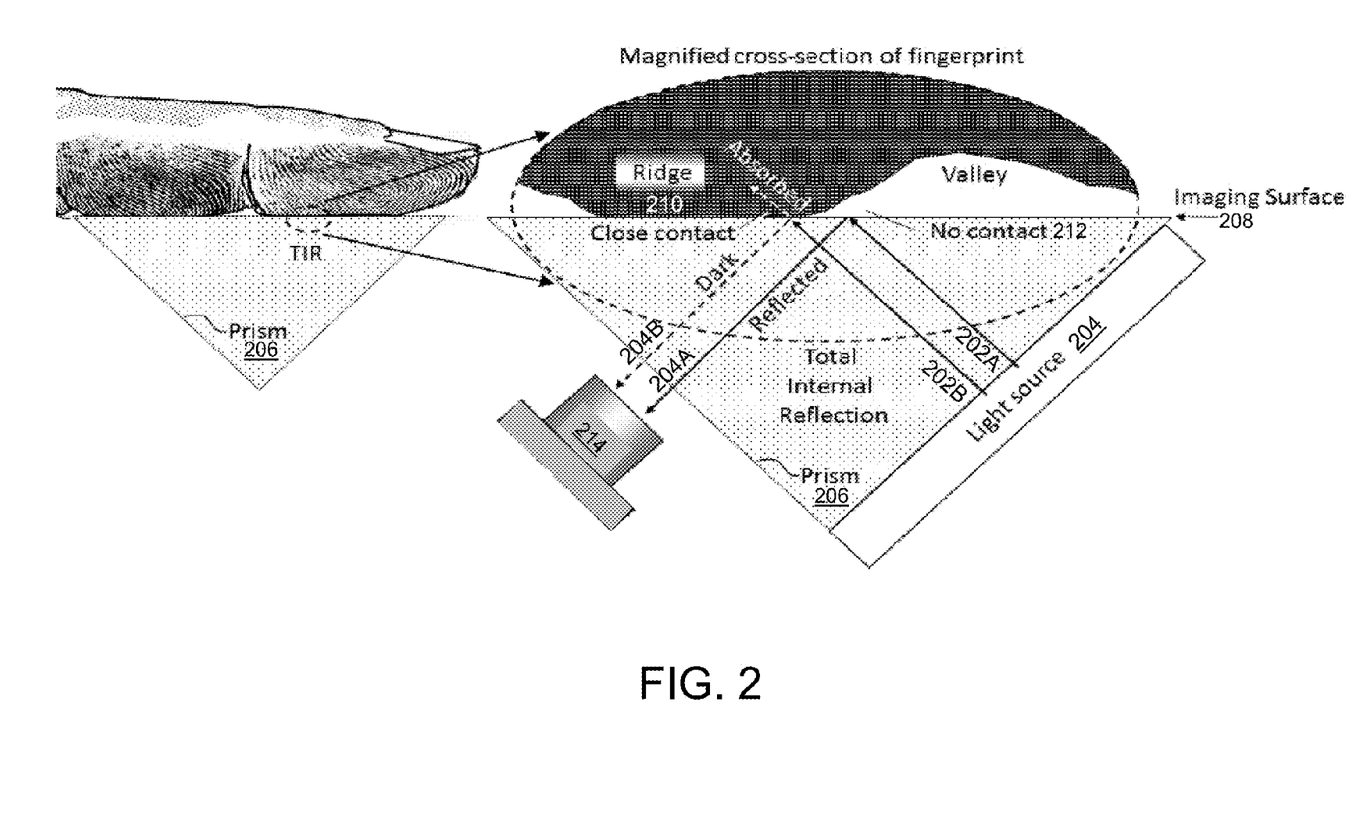
FIG. 2 illustrates a TIR based imaging system, in accordance with one or more implementations.

TIR based imaging systems are generally known in the art. Such systems have been developed to capture images of fingerprints using a prism (e.g., glass or plastic). FIG. 2 illustrates a TIR based imaging system, in accordance with one or more implementations. Light beam(s) 202 from a light source 204 is typically directed at a face of a prism at the critical angle. Incident angles beyond the critical angle will cause the propagating light to totally internally reflect in the prism and pass out through the opposing side. When a finger is placed on imaging surface 208 (e.g., the prism face where TIR occurs), it changes the boundary conditions such that where friction ridge(s) 210 make contact with the prism surface, the light wave is transmitted and largely attenuated by the skin. Where the friction ridges do not make contact (e.g., at 212), the light beam 204A is totally internally reflected by the interface and captured by a camera or sensor 214, which may be oriented to view the surface from the reflection angle matching the source angle of incidence. Light scattered or absorbed by the finger reduces the local light intensity in an image captured by the camera or the sensor 214. The result is high contrast fingerprint images from the prism surface scene such that the background appears light and a fingerprint (i.e., friction ridge signature) appears dark since the TIR is frustrated by the friction ridges.

Returning to FIG. 1, image system(s) 104 may include a TIR based imaging system having a pressure sensitive membrane. The pressure sensitive membrane may be arranged on the imaging surface of the TIR-based imaging system such that the subject presses their finger on a top surface of the pressure sensitive membrane. The pressure sensitive membrane may include a top surface, a bottom surface opposite the top surface, and/or other portions. The pressure sensitive membrane may comprise an elastic deformable film forming at least a portion of the top surface. The pressure sensitive membrane may be formed such that an application of pressure at any location on the top surface of the pressure sensitive membrane deforms the elastic deformable film to reduce a distance between the deformable film and the imaging surface at such location. In some implementations, the pressure sensitive membrane may include one or more of: an elastic film having a thickness between 1.5-10 µm, a light absorbing material, an electrically conductive layer, one or more standoffs on the bottom surface of the pressure sensitive membrane, and/or other features. In some implementations, the one or more standoffs may be 0.2-0.5 µm high and/or 1-5 µm wide. The one or more standoffs may be spaced 20-60 µm apart on the side of the pressure sensitive membrane closest to the imaging surface.

In some implementations, the pressure sensitive membrane may include an electrically conductive layer. The electrically conductive layer may be located on its lower and/or bottom surface. In some implementations, local pressure distributions from the friction ridges of the subject that are applied to the top surface of the pressure sensitive membrane may be converted to corresponding voltage and/or current distributions on the lower surface of the pressure sensitive membrane, which may be in contact with the imaging surface.

In some implementations, system 100 and/or imaging system(s) 104 may comprise a pressure sensitive membrane that responds to the pressure distribution applied from the friction ridges of the subject. The membrane further may contain electrically active materials. As such, a sensor (which may be part of imaging system 104) and detects electrical signals from interaction with the pressure sensitive membrane, may be configured to capture the sequence of images characterizing pressure distribution response of the pressure sensitive membrane over a time period.

System 100 may include a sensor. In some implementations, the sensor may be configured to capture the sequence of images. The sensor may generate and/or detect electrical signals from direct interaction with the friction ridges of the subject. As such, the sensor may include the imaging surface in such implementations.

By way of non-limiting example, the pressure sensitive membrane may be the same as or similar to the pressure sensitive membrane embodiments, and/or the systems and methods described in U.S. patent application Ser. No. 15/091,532, entitled "SYSTEMS AND METHODS FOR CAPTURING IMAGES USING A PRESSURE SENSITIVE MEMBRANE," filed Apr. 5, 2016, the foregoing being incorporated herein by reference in its entirety.

Figure 3:
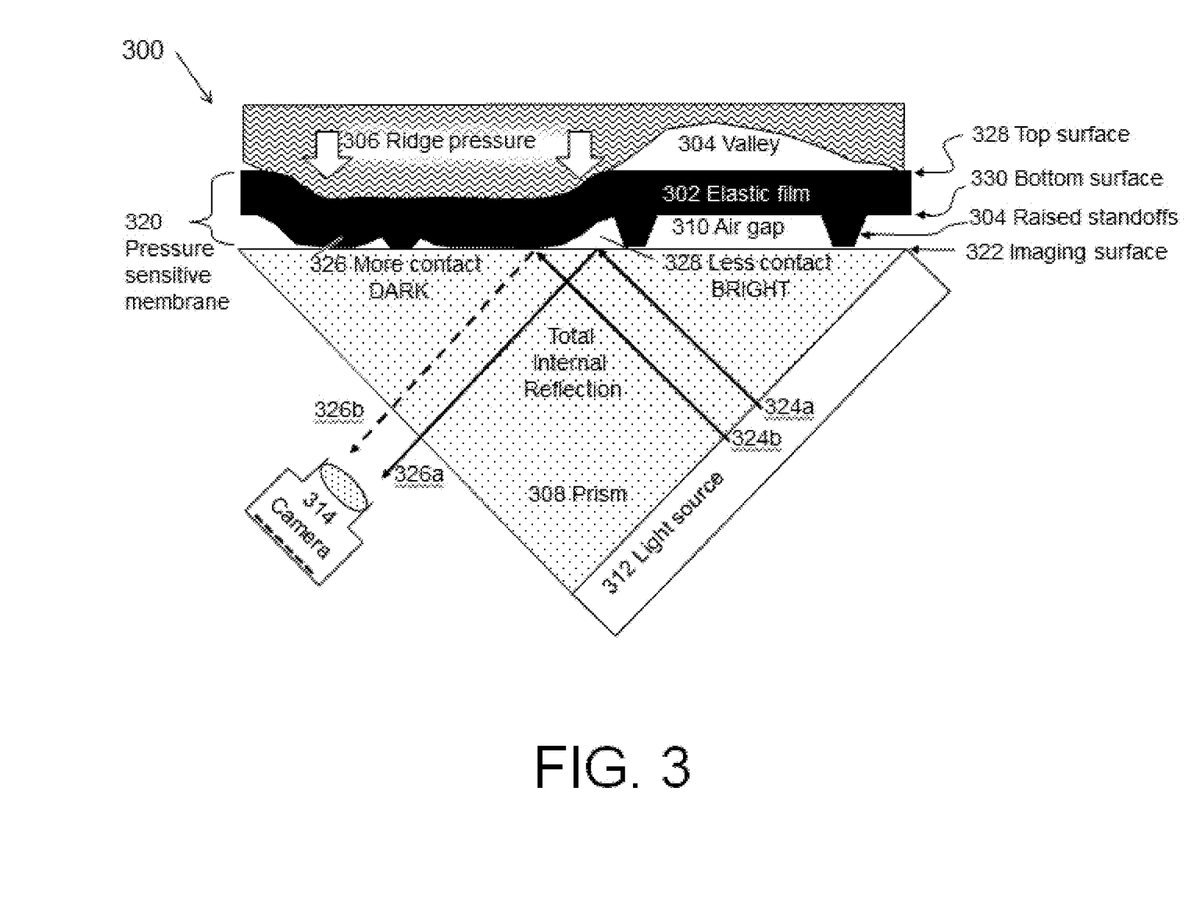
FIG. 3 illustrates a TIR based imaging system 300 with a pressure sensitive membrane 320, in accordance with one or more implementations.

By way of non-limiting example, FIG. 3 illustrates a TIR based imaging system 300 with a pressure sensitive membrane 320, in accordance with one or more implementations. The texture on the bottom surface 330 of the elastic film 302 may contain raised standoffs 304. Raised standoffs 304 may create a thin air gap 310 between elastic film 302 and imaging surface 322 of prism 308. Under a valley 304, air gap 310 may be maintained. Therefore, there may be less contact between elastic film 302 and imaging surface 322. When light ray 324a travels from light source 312 to imaging surface 322, it may undergo total internal reflection and may be detected by the camera 314 (and/or a sensor) as a local bright spot 328, so that valley 304 appears bright in a TIR image. A separate light ray 324b may reach the imaging surface 322 directly under applied ridge pressure 306. Under applied ridge pressure 306, the elastic film 302 may be deflected towards imaging surface 322 and/or may make more contact 326 with imaging surface 322. This contact 326 with the index matched and light absorbing material in the elastic film 302 may cause some of light ray 324b to refract into the film and be absorbed. Reflected light ray 326b may have a lower intensity when it reaches camera 314 (and/or a sensor). As such, camera 314 (and/or a sensor) may image regions under ridge 306 through pressure sensitive membrane 320 as darker.

Returning to FIG. 1, in some implementations, system 100 and/or imaging system(s) 104 may include one or more of a platen, waveguide, and/or prism having an imaging surface. Imaging system(s) 104 may include a light source emitting a light directed toward the imaging surface. Imaging system(s) 104 may include a sensor positioned on the first one side of the platen, waveguide, and/or prism. The sensor may be configured to capture the sequence of images over the time period.

By way of non-limiting example, system 100 may include one or more of a platen, a light source, a sensor, a pressure sensitive membrane, and/or other elements of imaging system(s) 104. The platen may be a prism through which light beams in a TIR based imaging system are directed and/or reflected. The platen may include an imaging surface at which a light source is directed. The sensor may be positioned on a side of the platen. The sensor may be configured to receive light reflected from the imaging surface to capture an image. The image may indicate areas of engagement between an imaging surface and the friction ridge pattern of the subject when the individual images are captured. The sensor may capture a sequence of images of the imaging surface. The sequence of images may be captured over a time period. In some implementations, the imaging surface may be curved and/or flexible.

The sequence of images may include multiple images captured sequentially. In some implementations, the sequence of images may include individual frames of a video. By way of non-limiting example, the sequence of images may be frames of a video captured via a TIR live scan device. Continuing the non-limiting example, a quantity of images in the sequence of images may be based at least partially on a frame rate of the video. In some implementations, a larger quantity of images and/or a faster frame rate (e.g., of a video and/or camera) may lead to images in the sequence of images being close together temporally. A faster frame rate may improve the detail of the aggregated representation and/or the ability of the aggregated representation to more accurately reflect the topography of the friction ridge pattern because the image sequence will reflect much smaller time slices for the same pressure applied.

In some implementations, imaging system 104 may include an electroluminescent imaging system. System 100 and/or imaging system(s) 104 may include one or more of an electrical voltage source or current source, an imaging surface, an electroluminescent layer, one or more sensors, and/or other components. The imaging surface may be configured to receive local electrical signals from the friction ridge pattern of the subject responsive to the subject placing their finger on the imaging surface. The electroluminescent layer may respond to the resulting pattern of electrical signals and may emit a pattern of light accordingly onto a sensor. A sensor may be positioned on one side of the electroluminescent layer. The sensor may be configured to receive light from the electroluminescent layer to capture a sequence of images.

By way of non-limiting example, imaging system 104 may include a capacitance based imaging system. Imaging system 104 may characterize a local friction ridge pattern via a sensor positioned on one side of the imaging surface. The sensor may be configured to characterize the local capacitance and/or impedance. The sensor may be configured to capture a sequence of images.

While a finger interacts with the imaging surface, a sequence of images may be generated by any of the fingerprint scanning technologies discussed previously. Selected mechanisms and principles by which additional detailed topographical information may be extracted from such a sequence of images are described below. Within the scope of this invention, these same mechanisms and principles may be applied to any of the fingerprint scanning technologies discussed previously, which meet the criteria of forming images of friction ridge patterns while a finger (or other hand part) interacts with an imaging surface.

As a subject presses their finger in contact with an imaging surface of a TIR based imaging system, the areas of engagement between an imaging surface and the friction ridge pattern of the subject may increase as pressure of the finger against the imaging surface increases, and/or compression of the friction ridge pattern increases. In some implementations, pressure of the finger may not be applied to the imaging surface evenly and/or a subject may readjust lifting their finger (decreasing pressure and compression of the friction ridge pattern. The sequence of images may include one or more images wherein one or more areas of engagement, pressure, and/or compression decrease for a point in time. As a subject may not apply pressure evenly, it is understood that increasing the areas of engagement between an imaging surface and the friction ridge pattern of the subject may indicate increasing overall areas of engagement and/or at least a portion of the area of engagement increases. In some implementations, the areas of engagement may increase and/or decrease in different portions of the friction ridge pattern.

The highest portions of the friction ridges may come into contact with the imaging surface before the lower portions of the friction ridges. Generally, as more pressure is applied by the subject, the friction ridges may flatten. The sequence of images captured may capture the changing amount of surface area of the imaging surface engaged by the friction ridge pattern (e.g., the changing areas of engagement between an imaging surface and the friction ridge pattern of the subject) as more of the friction ridge pattern comes into contact with the imaging surface. The changing areas of engagement between an imaging surface and the friction ridge pattern of the subject over time may be used to interpolate one or more changes in elevation and/or topography of the friction ridges of the subject.

In the typical single frame two-dimensional fingerprint known in the art, the image may be captured when the friction ridges are fully compressed such that the friction ridges appear to be flat and/or planar ridges surrounded by valleys or gaps between the ridges. Conversely, the present application may aggregate a sequence of images over a time period. The time period may begin when the friction ridges of the subject are at a minimal distance from the imaging surface without actually contacting the imaging surface. In some implementations, the time period may begin when a minimal area of engagement (e.g., lowest amount measurable and/or discernable by system 100 and/or imaging system 104, and/or at initial contact by one or more friction ridges) between the imaging surface and the friction ridge pattern of the subject. From the beginning of the time period to the end of the time period, the pressure applied by the subject and/or the friction ridges of the subject may increase and/or the surface area of the imaging surface engaged by the friction ridge pattern of the subject may increase over time due to increasing compression of the friction ridge pattern on the imaging surface.

Figure 4:
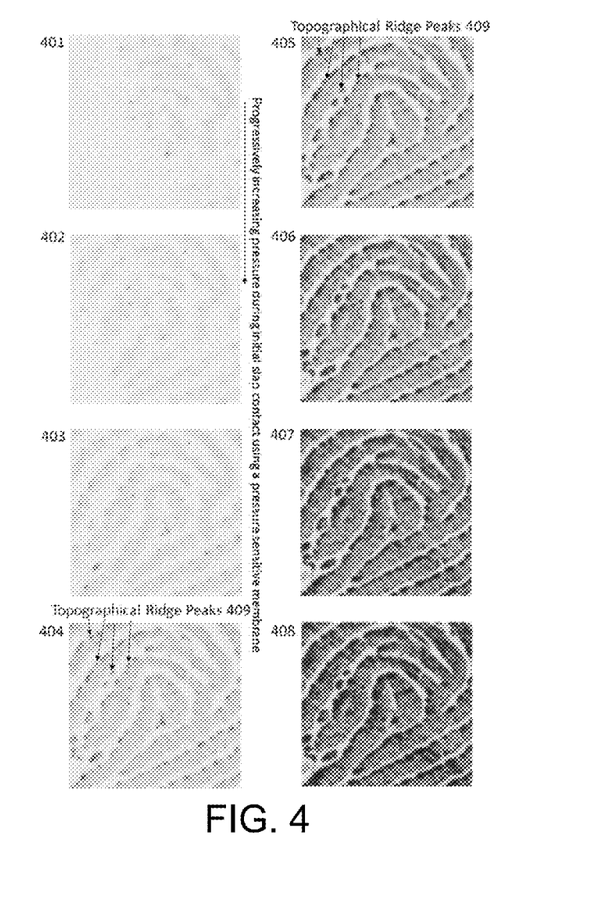
FIG. 4 illustrates a sequence of images captured by a TIR-based imaging system having a pressure sensitive membrane, in accordance with one or more implementations.

FIG. 4 illustrates a sequence of images captured by a sensor having a pressure sensitive membrane, in accordance with one or more implementations. Images 401-408 may include a sequence of images captured by a TIR-based imaging system having a pressure sensitive membrane. In some implementations, images 401-408 may include video images. Images 401-408 may illustrate progressively increasing pressure as a subject presses their finger (e.g., for a slap capture, etc.) on a pressure sensitive membrane arranged on an imaging surface of a TIR-based imaging system. Images 401-408 may be numbered and/or presented in sequential order in FIG. 4 based on their relative capture time. As such, image 401 may represent an image captured before images 402-408. Image 408 may be captured after images 401-407. One or more of images 401-408 may be the basis for and/or comprise the information representing the topography of the friction ridges of the subject from which one or more level-three features may be identified. By way of non-limiting example, one or more topographical ridge peaks 409 may be identifiable in image 404, image 405, and/or other images, and/or a comparison of one or more of image 404, image 405, and/or other images. Images 401-408 may depict pressure applied to a pressure sensitive membrane arranged on the imaging surface at different points in time over the time period during which the sequence of images are captured. In some implementations, images 401-408 may be captured as surface area of the imaging surface engaged by the friction ridge pattern of the subject increases over time due to increasing compression of the friction ridge pattern on the imaging surface. Some or all of images 401-408 may be aggregated into an aggregated representation of images 401-408. The aggregated representation of images 401-408 may areas of engagement and/or pressures of the friction ridge pattern at different elevations which may be determined from individual ones of images 401-408.

Figure 5:
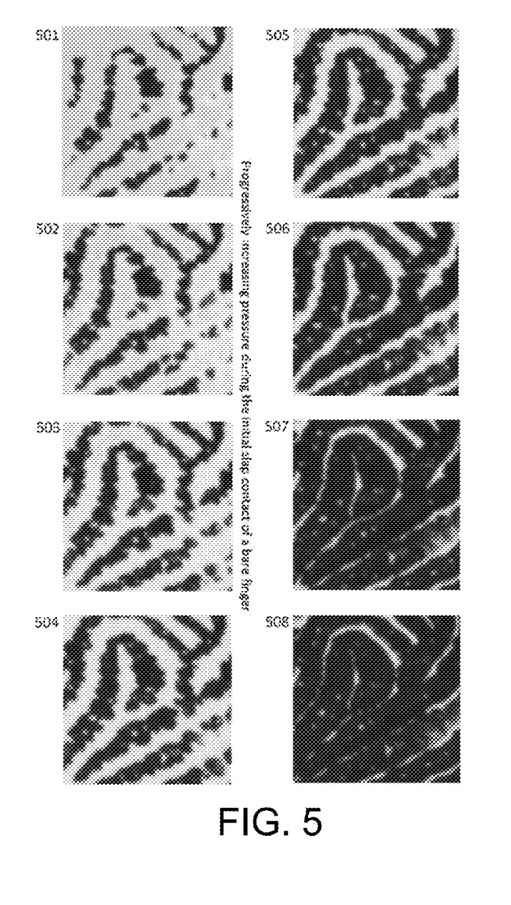
FIG. 5 illustrates a sequence of images captures by a TIR-based imaging system, in accordance with one or more implementations.

FIG. 5 illustrates a sequence of images captures by a sensor, in accordance with one or more implementations. Images 501-508 may include a sequence of images captured by a TIR-based imaging system without a pressure sensitive membrane. In some implementations, images 501-508 may include video images. Images 501-508 may illustrated progressively increasing pressuring as a subject presses their finger (e.g., for a slap capture, etc.) on an imaging surface of a TIR-based imaging system. Images 501-508 may be numbered in sequential order based on their relative capture time. As such, image 501 may represent the an image captured before images 502-508. Image 508 may be captured after images 501-507. Images 501-508 may depict the area of the imaging surface engaged by the friction ridge pattern of the subject at different points in time over the time period during which the sequence of images are captured. In some implementations, images 501-508 may be captured as the surface area of the imaging surface engaged by the friction ridge pattern of the subject increases over time due to increasing compression of the friction ridge pattern on the imaging surface. Some or all of images 501-508 may be the may be aggregated into an aggregated representation of images 501-508. The aggregated representation of images 501-508 may depict cross sectional shapes of the friction ridge pattern and/or areas of engagement between the imaging surface and the friction ridge pattern at different elevations which may be determined from individual ones of images 501-508.

Returning to FIG. 1, information component 112 may be configured to obtain the sequence of images. In some implementations, information component 112 may obtain the sequence of images from the imaging system(s) 104. By way of non-limiting example, the sequence of images may be transmitted over a network by imaging system 104 and/or received at information component 112.

Information component 112 may be configured to obtain temporal information for individual images in the sequence of images. The temporal information may convey relative timing of capture for the individual images in the sequence of images. Relative timing of capture may describe how close to the capture of the previous image the capture of another image is, the order in which one or more images in the sequence of images were captured, the frame rate associated with the capture of one or of more of the images in the sequence of images, and/or other information describing the relative timing of capture for the individual images in the sequence of images. In some implementations, the temporal information may include timestamps. As such, the individual images in the sequence of images may correspond to monotonically increasing timestamp values.

Aggregation component 114 may be configured to aggregate the individual images in the sequence of images into an aggregated representation of the friction ridge pattern. Aggregation component 114 may use the temporal information for the individual images to aggregate the individual images in the sequence of images into an aggregated representation of the friction ridge pattern. The aggregation may be accomplished such that the aggregated representation the areas of engagement of the friction ridge pattern with the imaging surface at different elevations of the friction ridge pattern. In some implementations, the aggregated representation may depict different elevations and/or changes in elevation of one or more portions of the friction ridge pattern. The different relative elevations may be determined from the timing of individual images of the areas of engagement of the friction ridge pattern with the imaging surface. In some implementations, the aggregation may represent cross sectional shapes of the friction ridge pattern at different elevations responsive to the sequence of images being captured as the surface area of the imaging surface engaged by the friction ridge pattern of the subject increased over time due to increasing compression of the friction ridge pattern on the imaging surface. The cross sectional shapes may not represent entirely straight and/or uniform cuts due to the subject applying various amounts of pressure, the imaging surface being flexible and/or curved, and/or for other reasons.

The aggregated representation of the friction ridge pattern may include one or more of a representation of a topography of the friction ridges of the subject (e.g., a topographical map, etc.), a pressure distribution, a pressure distribution map, and/or other aggregated representation of the friction ridge pattern. A topographical map may include one or more contours representing the areas of engagement and/or cross sectional shapes of the friction ridge pattern at different elevations of the friction ridge patterns.

The aggregated representation of the friction ridge pattern may include representation of a topography of the friction ridge pattern of the subject. In some implementations, aggregation component 114 may be configured to use changes in the areas of engagement between the imaging surface and the friction ridge pattern at different elevations and/or the temporal information, to determine relative elevation characteristics (e.g., elevations and/or heights of one or more portions, changes in elevation and/or height, etc.) and/or relief details of one or more three dimensional features of the friction ridge pattern of the subject. Such a determination of relative elevations and/or relative heights may be used to aggregate the individual images in the sequence of images into the representation of the topography of the friction ridges of the subject. By way of non-limiting example, as one or more areas of engagement increase in size and/or changes from one image to the next in the sequence of images, a relative elevation may be assigned to each image. The relative elevation may indicate the areas of engagement of the friction ridge pattern with the imaging surface at that elevation. In some implementations, comparative image analysis and/or sequential image subtraction may be used to identify the relative elevation associated with one or more of the images and/or for one or more regions of the aggregated representation of the friction ridge pattern (e.g., the friction ridge signature, fingerprint, etc.).

In some implementations, aggregating the sequence of images may include generating contours for the individual images. The contours for the individual images may correspond to the areas of engagement of the friction ridge pattern with the imaging surface at different elevations and/or pressure applied to the imaging surface at different points in time over the time period. The elevations may be determined from the individual images of the areas of engagement at different points in time over the time period. The elevations may include relative elevations. By way of non-limiting example, a first image in the sequence of images may be associated with a first timestamp indicating a first capture time in the time period and a first elevation at the highest three-dimensional point (e.g., a topographical peak and/or other high elevation) of a given portion of a friction ridge pattern; a second image in the sequence of images may be associated with a second timestamp indicating a second capture time after the first capture time in the time period, and a second elevation (e.g., at a second highest elevation) of the given portion of a friction ridge pattern; a third image in the sequence of images may be associated with a third timestamp indicating a third capture time after the second capture time in the time period, and a third elevation at a third elevation of the given friction ridge pattern lower than the second elevation.

The aggregated representation may include an aggregation of the contours for the individual images in the sequence of images. Continuing the non-limiting example, a first contour may be generated for the first image, a second contour may be generated for the second image, and/or a third contour may be generated for the third image such that the aggregated representation may include an aggregation of the first contour, the second contour, and/or the third contour. The aggregation of the contours for the individual images in the sequence of images may represent a topographical map of the friction ridge pattern of the subject.

By way of non-limiting example, the aggregated representation may include a pressure distribution map illustrating changes in the pressure distribution as the time period passes and/or pressure applied to a pressure sensitive membrane (via more friction ridge tissue being compressed and/or based on the composition of the friction ridge tissue). The pressure distribution map may indicate changes in pressure from one image in the sequence of images to the next image in terms of optical grayscale values, electrical property values, or other sensor output levels. Areas with locally higher output signal levels and/or darker gray scales may be assigned higher relative pressure values. In some implementations, responsive to the aggregated representation including a gray scale representation of a pressure distribution map, an uphill gradient may refer to the direction in which the gray scale values are changing from light to dark and/or a downhill gradient may refer to a direction in which the gray scale values are changing from dark to light. An uphill gradient may correlate with directions of increasing local applied pressure (e.g., to the pressure sensitive membrane) and/or increasing local ridge height (e.g., corresponding to increasing surface area of the friction ridges in contact with an imaging surface over time as the subject presses their finger on an imaging surface). A downhill gradient may correlate with directions of decreasing local applied pressure (e.g., to the pressure sensitive membrane) and/or decreasing local ridge height (e.g., corresponding to less and/or decreasing surface area of the friction ridges in contact with an imaging surface).

In some implementations, aggregation component 114 may be configured to generate gradients based on the sequence of images. The gradients may be generated based on changes in the areas of engagement of the friction ridge pattern with the imaging surface depicted in two or more images in the sequence of images. In some implementations, sets of neighboring images may be compared to identify changes in the areas of engagement and/or generate one or more gradients.

Areas with locally higher output signal levels and/or darker gray scales may correspond to one or more higher elevation portions of the friction ridges (e.g., topographical ridge peaks—due to higher elevations and/or one or more dermal papillae). By way of another non-limiting example, one or more lower elevation areas on the friction ridges of the subject (e.g., topographical ridge passes, etc.) may be indicated by locally lower output signal levels and/or lighter gray scales (e.g., one or more topographical ridge passes that run across one or more ridges may be identified based on lower output signals and/or lighter gray scales surrounded by higher output signals and/or darker gray scales on two sides, depicting a lower ridge which may generally run perpendicular to the direction of the friction ridge on which it is located).

Figure 6A:
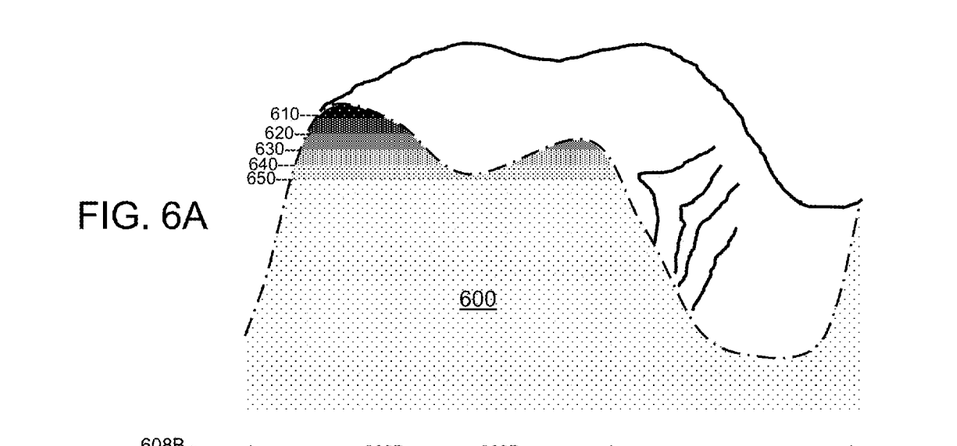
FIG. 6A illustrates a cross section of a friction ridge of a subject, in accordance with one or more implementations.
Figure 6B:
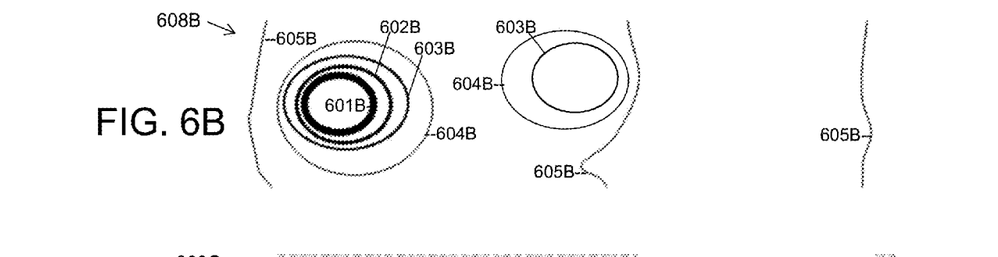
FIG. 6B illustrates an aggregated representation for the sequence of images capturing the friction ridge illustrated in FIG. 6A, in accordance with one or more implementations.
Figure 6C:
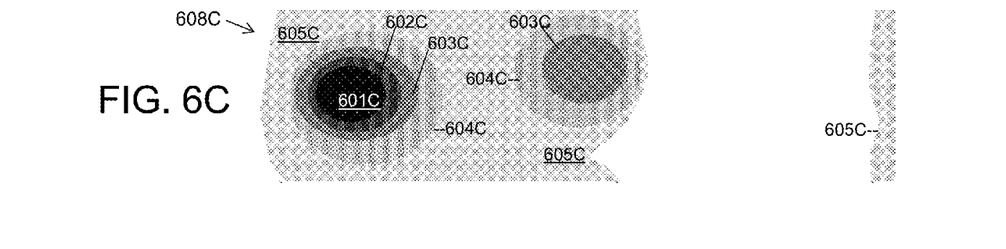
FIG. 6C illustrates an aggregated representation for the sequence of images capturing the friction ridge illustrated in FIG. 6A, in accordance with one or more implementations.

FIGS. 6A-6C illustrate a cross section of a friction ridge of a subject with corresponding aggregated representations for a sequence of images, in accordance with one or more implementations. FIG. 6A illustrates a cross section of a friction ridge 600 of a subject, in accordance with one or more implementations. Elevations 610-650 may correspond to individual images in a sequence of five images captured. Elevations 610-650 may indicate the elevations to which the areas of engagement of the friction ridge pattern with the imaging surface depicted by the aggregated representation correspond. Elevation 610 may correspond to a first image. When the first image is captured, the portions of friction ridge 600 that may be in contact with and/or engaged by the imaging surface and/or a pressure sensitive membrane are those portions of friction ridge 600 at and/or above elevation 610. Elevation 620 may correspond to a second image. When the second image is captured, the portions of friction ridge 600 that may be in contact with and/or engaged by the imaging surface and/or a pressure sensitive membrane are those portions of friction ridge 600 at and/or above elevation 620. Elevation 630 may correspond to a third image. When the third image is captured, the portions of friction ridge 600 that may be in contact with and/or engaged by the imaging surface and/or a pressure sensitive membrane are those portions of friction ridge 600 at and/or above elevation 630. Elevation 640 may correspond to a fourth image. When the fourth image is captured, the portions of friction ridge 600 that may be in contact with and/or engaged by the imaging surface and/or a pressure sensitive membrane are those portions of friction ridge 600 at and/or above elevation 640. Elevation 650 may correspond to a fifth image. When the fifth image is captured, the portions of friction ridge 600 that may be in contact with and/or engaged by the imaging surface and/or a pressure sensitive membrane are those portions of friction ridge 600 at and/or above elevation 650.

FIG. 6B illustrates an aggregated representation for the sequence of images capturing friction ridge 600, in accordance with one or more implementations. Aggregated representation 608B includes an aggregation of contours corresponding to the cross sectional shapes of the friction ridge pattern at elevations 610-650. The first image in the sequence of images is associated with a first contour 601B. The second image in the sequence of images is associated with a second contour 602B. The third image in the sequence of images is associated with a third contour 603B. The fourth image in the sequence of images is associated with a fourth contour 604B. The fifth image in the sequence of images is associated with a fifth contour 605B. Aggregated representation 608B may represent the topography of friction ridge 600 (e.g., aggregated representation 608B may be a topographical map). Aggregated representation 608B may be generated and/or aggregated by a TIR based imaging system with or without a pressure sensitive membrane.

FIG. 6C illustrates an aggregated representation for the sequence of images capturing friction ridge 600, in accordance with one or more implementations. Aggregated representation 608C includes an aggregation of pressure distributions (forming a pressure map) corresponding to the areas of engagement between an imaging surface and the friction ridge pattern at elevations 610-650. The first image in the sequence of images is associated with a first pressure distribution 601C. The second image in the sequence of images is associated with a second pressure distribution 602C. The third image in the sequence of images is associated with a third pressure distribution 603C. The fourth image in the sequence of images is associated with a fourth pressure distribution 604C. The fifth image in the sequence of images is associated with a fifth pressure distribution 605C. Aggregated representation 608C may represent the topography of friction ridge 600 (e.g., aggregated representation 608C may be a pressure distribution map). Aggregated representation 608C may be generated and/or aggregated by a TIR based imaging system having a pressure sensitive membrane.

Returning to FIG. 1, feature identification component 116 may be configured to identify one or more level-three features of the friction ridge signature of the subject. One or more level-three features may be identified based on the aggregated representation of the friction ridge pattern. By way of non-limiting example, these three-dimensional features may be identified in the friction ridge signature of the subject based on information representing the topography of the friction ridges of the subject, a pressure distribution, a pressure distribution map, and/or another aggregated representation of the friction ridge pattern. As such, aggregated representation of the friction ridge pattern may be used as a new basis for fingerprint identification. The one or more level-three features may include one or more topographical ridge peaks, topographical ridge notches, topographical ridge passes, pores, and/or other topographical and/or three dimensional features of the friction ridge signature of the subject. By way of non-limiting example, feature identification component 116 may identify two topographical ridge peaks in individual ones of the aggregated representations illustrated in FIG. 6B and FIG. 6C.

Comparative image analysis and/or sequential image subtraction may be used to identify the relative elevation of one or more regions of the aggregated representation of the friction ridge pattern (e.g., the friction ridge signature, fingerprint, etc.). In some implementations, the resulting point cloud data may be assembled into a 3D map (e.g., in two dimensional form) of the fingerprint surface (e.g., information representing the topography of the friction ridge pattern), which may be analyzed to extract level three features, and/or standard level II features.

Topographical ridge peaks may include one or more high (e.g., high elevation, etc.) points, local apexes, crests, and/or peaks of a friction ridge. An individual friction ridge may include one or more topographical ridge peaks. A topographical ridge pass may include a path across a friction ridge that has a lower height and/or elevation. In some implementations, a topographical ridge pass may include a lower elevation pass or path between one or more topographical ridge peaks. The topographical ridge pass may vary in elevation.

A topographical notch may include one or more of an indentation, a dent, an impression, a depression, a cut out, and/or an imprint in the surface and/or edge of one or more friction ridges. By way of non-limiting example, a topographical notch may include an indentation on an edge of the three-dimensional friction ridge. Continuing the non-limiting example, the indentation on the edge of the friction ridge may not extend through the friction ridge uniformly. A pore may include an orifice and/or hole in a friction ridge of a subject. Pores may generally be known as level-three features, however pores may only be displayed by TIR based imaging systems when the pores are inactive because the moisture in active pores may cause index matching (e.g., which makes the pore appear black, just like surrounding ridge tissue in contact with the imaging surface). In previous systems, where a single frame is used to identify friction ridge pattern features, pores may be unreliable features. Under various amounts of pressure, a pore may appear to be a notch and/or vice versa. Identifying level-three features based on an aggregated representation of a sequence of images of the friction ridge pattern of the subject may eliminate these issues.

Feature identification component 116 may be configured to identify one or more level-three features of the friction ridge signature of the subject based the aggregated representation of the friction ridge pattern captured over the time period, and/or other information. One or more topographical ridge peaks may be identified by feature identification component 115 based on the surface area of imaging surface engaged by the friction ridge pattern of the subject at different points in time during the process of initial contact between a finger and the imaging surface. By way of non-limiting example, the pressure applied by the finger may be increasing, and/or the distance between the imaging surface and the friction ridges of the subject (and/or the epidermal and/or dermal features of the finger) is decreasing. As such, regions of the friction ridge pattern of the subject that are higher, relative to low fingerprint valleys, may come in contact with the imaging surface first. Progressively lower regions of the ridge may sequentially contact the imaging surface during the time period in which the sequence of images are captured (e.g., and/or in which a video capture runs). In some implementations, aggregating the individual images in the sequence of images into an aggregated representation of the friction ridge pattern may include methods of comparing sequential images to identify areas of new contact between the finger and the imaging surface (e.g., changes in surface area of the imaging surface engaged by the friction ridge pattern of the subject and/or changes in the areas of engagement between the imaging surface and the friction ridge pattern of the subject). By way of non-limiting example, the aggregated representation of the friction ridge pattern may include a reconstruction of the topography of the friction ridges based on an assignment of a monotonically decreasing height value corresponding with all new pixels that became darker during the corresponding monotonically increasing timestamp values of that sequence of images. Other suitable methods of extracting topography from a sequence of images may exist and are contemplated by the present application.

Processor(s) 124, imaging system(s) 104, external resources 128, and/or other components may be operatively linked via one or more electronic communication links. For example, such electronic communication links may be established, at least in part, via a network 130 such as the Internet and/or other networks. It will be appreciated that this is not intended to be limiting, and that the scope of this disclosure includes implementations in which processor(s) 124, imaging system(s) 104, external resources 128, and/or other components may be operatively linked via some other communication media.

In some implementations, a given imaging system 104 may include the one or more processor(s). External resources 128 may include sources of information, hosts and/or providers outside of system 100, external entities participating with system 100, and/or other resources.

In some implementations, processor(s) 124 is configured to provide information processing capabilities. As such, processor(s) 124 may include one or more of a digital processor, an analog processor, a digital circuit designed to process information, an analog circuit designed to process information, a state machine, and/or other mechanisms for electronically processing information. Although processor(s) 124 is shown in FIG. 1 as a single entity, this is for illustrative purposes only. In some implementations, processor(s) 124 may include a plurality of processing units. These processing units may be physically located within the same device (e.g., within imaging system 104), or processor(s) 124 may represent processing functionality of a plurality of devices operating in coordination. Processor(s) 124 may be configured to execute components 112, 114, 116 and/or other components. Processor(s) 124 may be configured to execute components 112, 114, 116, and/or other components by software; hardware; firmware; some combination of software, hardware, and/or firmware; and/or other mechanisms for configuring processing capabilities on processor(s) 124.

It should be appreciated that although components 112, 114, 116 are illustrated in FIG. 1 as being co-located within a single processing unit, in implementations in which processor(s) 124 includes multiple processing units, one or more of components 112, 114, 116 may be located remotely from the other components. The description of the functionality provided by the different components 112, 114, 116 described below is for illustrative purposes, and is not intended to be limiting, as any of components 112, 114, 116 may provide more or less functionality than is described. For example, one or more of components 112, 114, 116 may be eliminated, and some or all of its functionality may be provided by other ones of components 112, 114, and/or 116. As another example, processor(s) 124 may be configured to execute one or more additional components that may perform some or all of the functionality attributed below to one of components 112, 114, 116.

Figure 7:
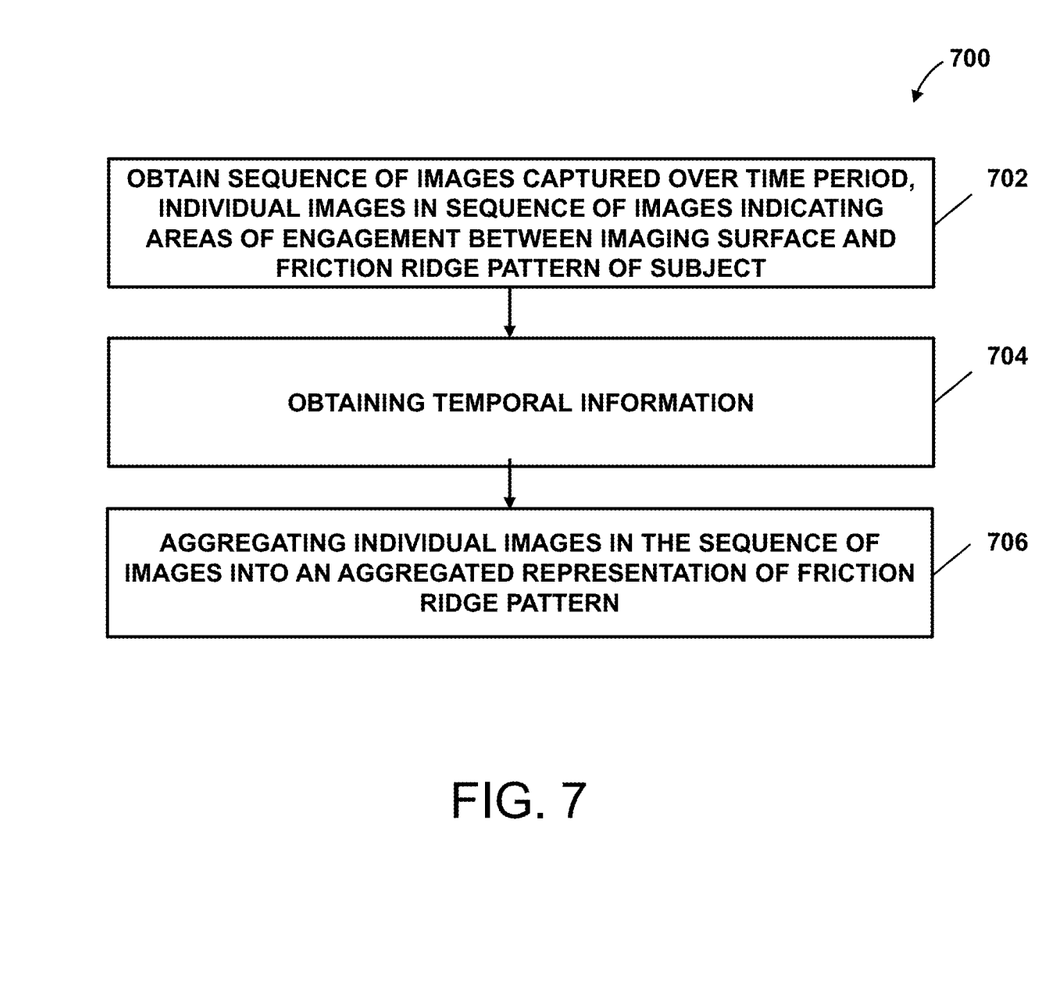
FIG. 7 illustrates a method for generating a representation of variations in elevation of friction ridges in a friction ridge pattern of a subject, in accordance with one or more implementations.

FIG. 7 illustrates a method 700 for generating a representation of variations in elevation of friction ridges in a friction ridge pattern of a subject, in accordance with one or more implementations. The operations of method 700 presented below are intended to be illustrative. In some implementations, method 700 may be accomplished with one or more additional operations not described, and/or without one or more of the operations discussed. Additionally, the order in which the operations of method 700 are illustrated in FIG. 7 and described below is not intended to be limiting.

In some implementations, method 700 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 700 in response to instructions stored electronically on an electronic storage medium. The one or more processing devices may include one or more devices configured through hardware, firmware, and/or software to be specifically designed for execution of one or more of the operations of method 700.

At operation 702, a sequence of images captured over a time period may be obtained. Individual images in the sequence of images may indicate areas of engagement between an imaging surface and the friction ridge pattern of the subject when the individual images are captured. The individual images may be captured as the areas of engagement increase over time due to increasing compression of the friction ridge pattern on the imaging surface. Operation 702 may be performed by an information component the same as or similar to information component 112 (illustrated in FIG. 1).

At operation 704, temporal information for individual images may be obtained. The temporal information may convey relative timing of capture for the individual images with respect to capture of the other images in the sequence of images. Operation 704 may be performed by an information component the same as or similar to information component 112 (illustrated in FIG. 1).

At operation 708, the temporal information for the individual images may be used to aggregate the individual images in the sequence of images into an aggregated representation of the friction ridge pattern. The aggregation may be accomplished such that the aggregated representation depicts the areas of engagement of the friction ridge pattern with the imaging surface at different elevations of the friction ridge pattern. Operation 708 may be performed by an aggregation component the same as or similar to aggregation component 114 (illustrated in FIG. 1).

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system configured to generate a representation of variations in elevation of friction ridges, wherein a friction ridge pattern is formed from the friction ridges, the system comprising:

an imaging surface;

a sensor positioned on a side of the imaging surface and configured to capture a sequence of images of the imaging surface over a time period; and one or more processors configured by machine-readable instructions to:

obtain the sequence of images captured over the time period, individual images in the sequence of images indicating areas of engagement between the imaging surface and the friction ridge pattern of the subject when the individual images are captured, wherein the individual images are captured as the areas of engagement increase over time due to increasing compression of the friction ridge pattern on the imaging surface;

obtain temporal information for the individual images conveying relative timing of capture for the individual images with respect to capture of other images in the sequence of images; and use the temporal information for the individual images to aggregate the individual images in the sequence of images into an aggregated representation of the friction ridge pattern, the aggregation being accomplished such that the aggregated representation depicts the areas of engagement of the friction ridge pattern with the imaging surface at different elevations of the friction ridge pattern, wherein the aggregated representation of the friction ridge pattern includes a representation of a topography of the friction ridge pattern of the subject.

2. The system of claim 1, further comprising:

the imaging surface, wherein the imaging surface includes a pressure sensitive membrane arranged on the imaging surface, the pressure sensitive membrane including a top surface, a bottom surface opposite the top surface, and an elastic deformable film forming at least a portion of the top surface, the pressure sensitive membrane being formed such that an application of pressure at any location on the top surface of the pressure sensitive membrane deforms the elastic deformable film to reduce a distance between, and/or to increase the contact area between the deformable film and the imaging surface at such location.

3. The system of claim 2, wherein the pressure sensitive membrane includes one or more of: an elastic film having a thickness between 1.5-10 μm, a light absorbing material, an electrically conductive layer, and/or one or more standoffs on the bottom surface of the pressure sensitive membrane.

4. The system of claim 1, wherein the individual images and/or the aggregated representation of the friction ridge pattern includes a pressure distribution and/or a pressure distribution map.

5. The system of claim 1, wherein the processor is configured by machine-readable instructions to use changes in the areas of engagement between the imaging surface and the friction ridge pattern at different elevations and the temporal information to determine relative elevation of one or more three dimensional features of the friction ridge pattern of the subject.

6. The system of claim 1, wherein aggregating the sequence of images includes generating contours for the individual images, the contours corresponding to the areas of engagement of the friction ridge pattern with the imaging surface at different elevations and/or pressure applied to the imaging surface at different points in time over the time period.

7. The system of claim 1, wherein aggregating the sequence of images includes generating gradients based on the sequence of images, wherein the gradients are generated based on changes in the areas of engagement of the friction ridge pattern with the imaging surface depicted in two or more images in the sequence of images.

8. The system of claim 1, wherein the temporal information includes timestamps such that the individual images in the sequence of images correspond to monotonically increasing timestamp values for the sequence of images.

9. The system of claim 1, wherein the sequence of images include sequential video frames, and a quantity of images in the sequence of images is based at least partially on a frame rate of a video including the sequential video frames.

10. The system of claim 1, wherein one or more processors are further configured by machine-readable instructions to identify one or more level-three features of the friction ridge signature of the subject based on the aggregated representation of the friction ridge pattern, wherein the one or more level-three features include one or more topographical ridge peaks, topographical ridge notches, and/or topographical ridge passes.

11. The system of claim 1, further comprising:
a platen, waveguide, or prism having the imaging surface; and
a light source emitting a light directed toward the imaging surface;
wherein the sensor is positioned on the first one side of the platen, waveguide, or prism, wherein the sensor is configured to capture the sequence of images over the time period.

12. The system of claim 1, further comprising:
an electrical voltage source or current source,
wherein the imaging surface is configured to receive local electrical signals that are generated by contact with the friction ridge pattern of the subject; and
an electroluminescent layer responding to the electrical signals and emitting light onto the sensor,
wherein the sensor is positioned on one side of the electroluminescent layer, and wherein the sensor is configured to receive light from the electroluminescent layer to capture the sequence of images.

13. A method for generating a representation of variations in elevation of friction ridges, wherein a friction ridge pattern is formed from the friction ridges, the method being implemented by one or more processors configured by machine-readable instructions, the method comprising:
capturing, via a sensor positioned on a side of an imaging surface, a sequence of images of the imaging surface over a time period;
obtaining the sequence of images captured over the time period, individual images in the sequence of images indicating areas of engagement between an imaging surface and the friction ridge pattern of the subject when the individual images are captured, wherein the individual images are captured as the areas of engagement increase over time due to increasing compression of the friction ridge pattern on the imaging surface;
obtaining temporal information for the individual images conveying relative timing of capture for the individual images with respect to capture of other images in the sequence of images;
using the temporal information for the individual images to aggregate the individual images in the sequence of images into an aggregated representation of the friction ridge pattern, the aggregation being accomplished such that the aggregated representation depicts the areas of engagement of the friction ridge pattern with the imaging surface at different elevations of the friction ridge pattern, wherein the aggregated representation of the friction ridge pattern includes a representation of a topography of the friction ridge pattern of the subject.

14. The method of claim 13, wherein the imaging surface includes a pressure sensitive membrane arranged on the imaging surface, the pressure sensitive membrane including a top surface, a bottom surface opposite the top surface, and an elastic deformable film forming at least a portion of the top surface, the pressure sensitive membrane being formed such that an application of pressure at any location on the top surface of the pressure sensitive membrane deforms the elastic deformable film to reduce a distance between, and/or to increase the contact area between the deformable film and the imaging surface at such location.

15. The method of claim 14, wherein the pressure sensitive membrane includes one or more of: an elastic film having a thickness between 1.5-10 μm, a light absorbing material, an electrically conductive layer, and/or one or more standoffs on the bottom surface of the pressure sensitive membrane.

16. The method of claim 13, wherein the individual images and/or the aggregated representation of the friction ridge pattern includes a pressure distribution and/or a pressure distribution map.

17. The method of claim 13, further comprising using changes in the areas of engagement between the imaging surface and the friction ridge pattern at different elevations and the temporal information to determine relative elevation characteristics and/or relief details of one or more three dimensional features of the friction ridge pattern of the subject.

18. The method of claim 13, wherein aggregating the sequence of images includes generating contours for the individual images, the contours corresponding to the areas of engagement of the friction ridge pattern with the imaging surface at different elevations and/or pressure applied to the imaging surface at different points in time over the time period.

19. The method of claim 13, wherein aggregating the sequence of images includes generating gradients based on the sequence of images, wherein the gradients are generated based on changes in the areas of engagement of the friction ridge pattern with the imaging surface depicted in two or more images in the sequence of images.

20. The method of claim 13, wherein the temporal information includes timestamps such that the individual images in the sequence of images correspond to monotonically increasing timestamp values for the sequence of images.

21. The method of claim 13, wherein the sequence of images include sequential video frames, and a quantity of images in the sequence of images is based at least partially on a frame rate of a video including the sequential video frames.

22. The method of claim 13, further comprising identifying one or more level-three features of the friction ridge signature of the subject based on the aggregated representation of the friction ridge pattern, wherein the one or more level-three features include one or more topographical ridge peaks, topographical ridge notches, and/or topographical ridge passes.

23. The method of claim 13, further comprising:
receiving, by the imaging surface, local electrical signals from the friction ridge pattern of the subject; and
responding, by an electroluminescent layer, to the electrical signals and emitting light onto a sensor;
wherein the sequence of images are captured via a sensor positioned on one side of the electroluminescent layer and wherein the sensor is configured to receive light from the electroluminescent layer.

24. The method of claim 13, further comprising:
characterizing, via the sensor positioned on one side of the imaging surface and configured to characterize the local capacitance and/or impedance, the local friction ridge pattern.

* * * * *